(12) United States Patent
Dunavan

(10) Patent No.: US 8,437,161 B1
(45) Date of Patent: May 7, 2013

(54) INFORMATION STORAGE SYSTEM FOR BUILDINGS, STRUCTURES, OR TOMBSTONES

(76) Inventor: Joseph E. Dunavan, Rossville, IL (US)

(*) Notice: Subject to any disclaimer, the term of this patent is extended or adjusted under 35 U.S.C. 154(b) by 195 days.

(21) Appl. No.: 13/157,055

(22) Filed: Jun. 9, 2011

(51) Int. Cl.
*G11C 5/02* (2006.01)
(52) U.S. Cl.
USPC .................................. 365/51; 365/52
(58) Field of Classification Search ............ 365/51, 365/52, 63; 40/124.5, 455
See application file for complete search history.

(56) References Cited

U.S. PATENT DOCUMENTS

| | | |
|---|---|---|
| D256,460 S | 8/1980 | Slepetz |
| D322,862 S | 12/1991 | Miller |
| 5,696,488 A | 12/1997 | Assisi |
| 5,729,921 A | 3/1998 | Rojas |
| 6,340,978 B1 | 1/2002 | Mindrum |
| 6,414,663 B1 | 7/2002 | Manross, Jr. |
| 6,980,107 B1 | 12/2005 | Ziegler |
| 7,089,495 B2 | 8/2006 | Barrows |
| 7,609,506 B2 | 10/2009 | Aguirre |
| 2011/0047893 A1* | 3/2011 | Iezza ........................ 52/103 |

* cited by examiner

*Primary Examiner* — Vu Le

(57) ABSTRACT

A memory storage system for installing in a wall, building, structure, or tombstone. The system features a microprocessor and memory storage component for storing pictures, videos, audio files, personal information, building plans, building information, inspection information, or a combination thereof. The system can be connected to a computer system via a cable so that the information can be accessed.

16 Claims, 4 Drawing Sheets

(Front ISO View)

(Front ISO View)

(Bottom ISO View)

(Exploded View)

(Front View)

(In-use View)

(Block Diagram)

INFORMATION STORAGE SYSTEM FOR BUILDINGS, STRUCTURES, OR TOMBSTONES

FIELD OF THE INVENTION

The present invention is directed to an information storage system, more particularly to a storage system for storing information about buildings, structures, or tombstones.

BACKGROUND OF THE INVENTION

The present invention is directed to an information storage system for building, structures, or tombstones. The information storage system of the present invention provides an easy convenient and accurate way of displaying and preserving information.

This information storage system is a memory storage system that can be installed in buildings, structures, and tombstones. The storage system preserves important information about a deceased individual or a landmark or other structure or building by storing information such as when a structure was built, the blueprints/diagrams, or other information. Information is stored on the microprocessor/memory storage component, and it can be accessed via a cable/computer system. The cap provides a water-tight and/or air-tight seal with the shell. When the shell is installed in the wall/structure, the first end (with the cap) is exposed.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
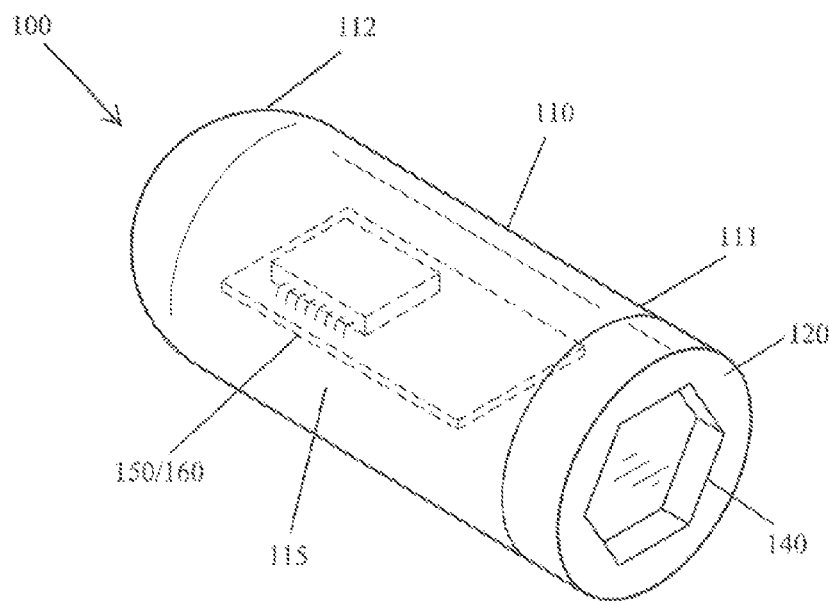
FIG. 1 is a perspective view of the system of the present invention..
Figure 2:
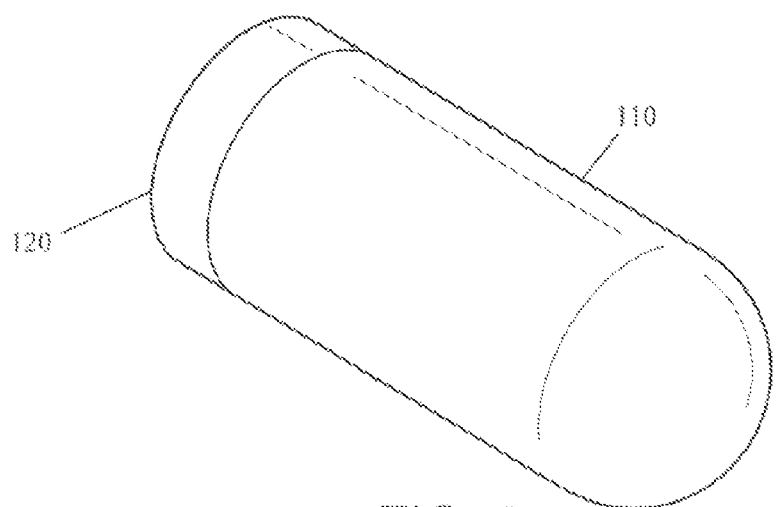
FIG. 2 is a bottom view of the system of the present invention.
Figure 3:
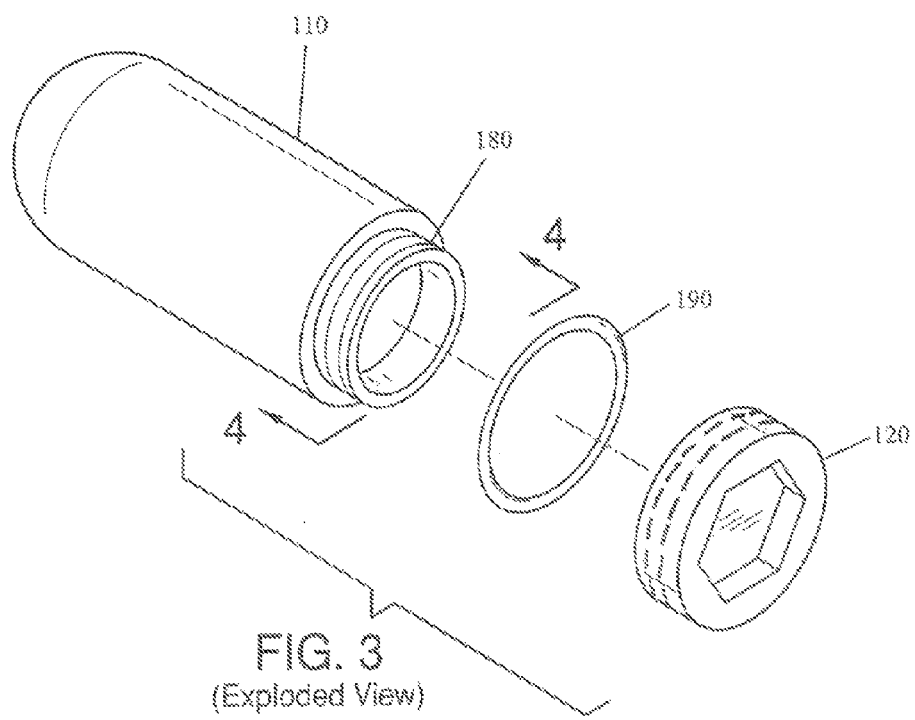
FIG. 3 is an exploded view of the system of the present invention.
Figure 4:
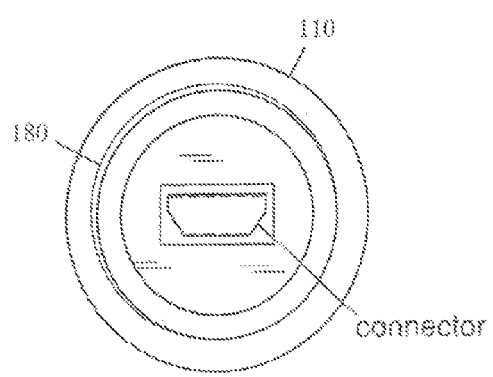
FIG. 4 is a front view of the system of the present invention.
Figure 5:
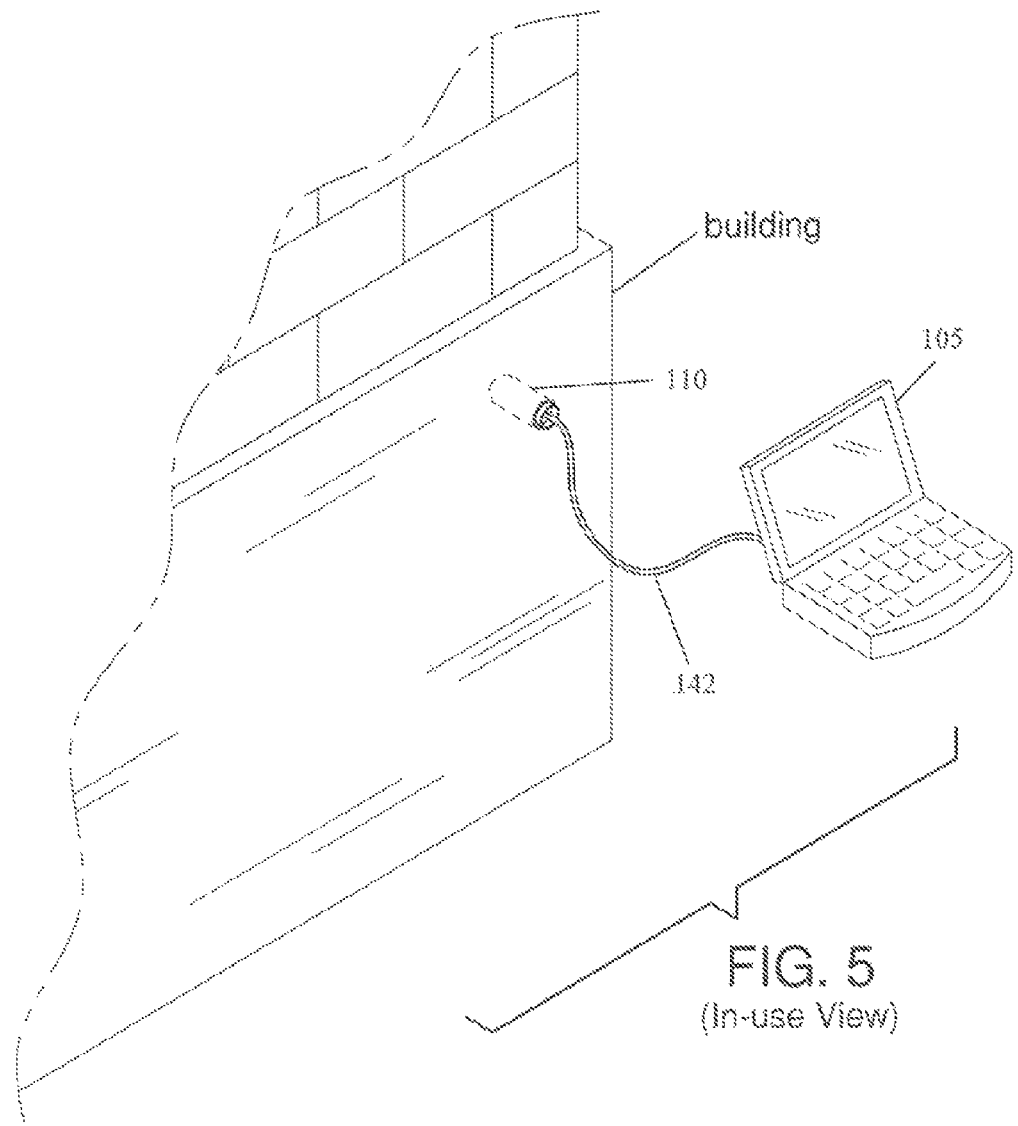
FIG. 5 is an in-use view of the system of the present invention.
Figure 6:
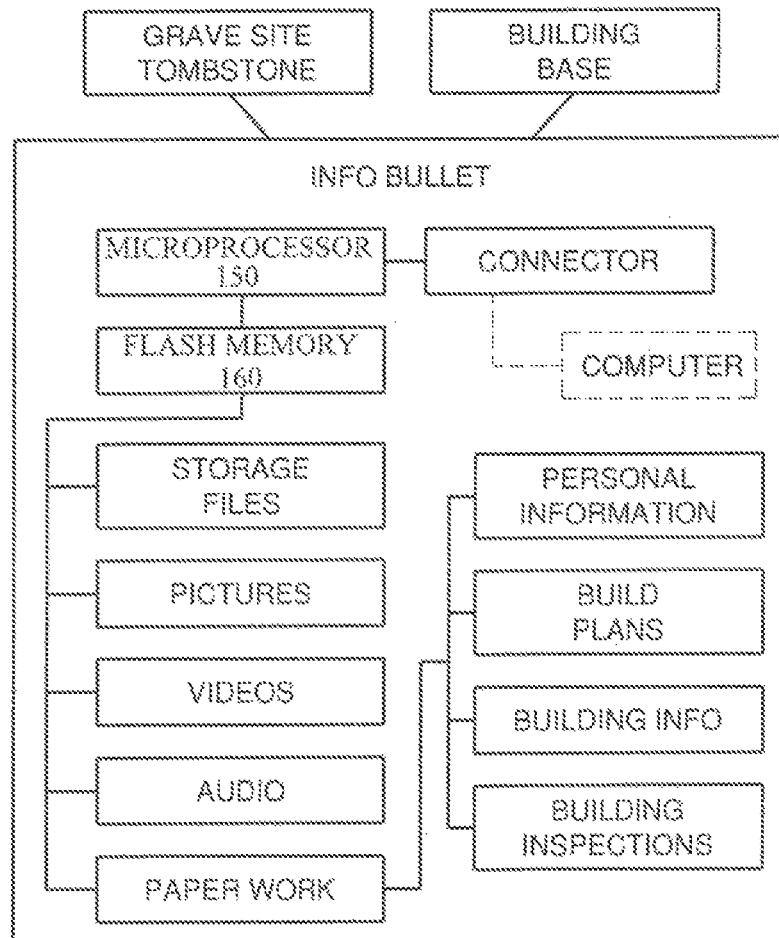
FIG. 6 is a schematic view of the present invention.

Referring now to FIG. 1-5, the present invention features a memory storage system 100 that can be installed in buildings, structures, and tombstones. The storage system 100 preserves important information about a deceased individual or a landmark or other structure or building by storing information such as when a structure was built, the blueprints/diagrams, or other information.

The system comprises a shell 110 having a first end 111, a second end 112, and an inner cavity 115. In some embodiments, the shell 110 is generally bullet-shaped or cylindrical. The shell 110 is not limited to a bullet shape or a cylindrical shape. In some embodiments, the shell 110 is constructed from a material comprising a non-corrosive metal. In some embodiments, the shell 110 is constructed from a material comprising stainless steel. The shell 110 is generally adapted to be installed in a wall or a building, structure, or tombstone. The system 100 is not limited to use in buildings, structures, and tombstones.

A microprocessor 150 is disposed in the inner cavity 115 of the shell 110. The microprocessor 150 is operatively connected to a memory storage component 160 adapted to store information. In some embodiments, the memory storage component comprises flash memory, random access memory (RAM), read-only memory (ROM), static RAM, static ROM, electrically erasable programmable read-only memory (EEPROM), or a combination thereof.

The system further comprises a connector socket 140 disposed in the first end of the shell 110 and operatively connected to the microprocessor 150. The, connector socket 140 is adapted to operatively connect to a cable 142 (e.g., universal serial bus cable) of a computer system 105. In some embodiments, the computer system 105 is a laptop or a smart phone. The computer system 105 may include but is not limited to a laptop, a smart phone, or other electronic device (e.g., an iPad®).

The system further comprises a cap 120 removably attached to the shell 110 covering the connector socket 140. The cap 120 can move between at least an open position and a closed position respectively allowing and preventing access to the connector socket 140. The cap 120 provides a water-tight and/or air-tight seal with the shell 110. When the shell 110 is installed in the wall/structure, the first end (with the cap 120) is exposed.

In some embodiments, the inner cavity 115 of the shell 110 is filled with a material comprising nitrogen gas.

In some embodiments, the information stored on the memory storage component comprises a picture, a video, an audio file, personal information, building plans, building information, inspection information, or a combination thereof. Note that the information stored on the memory storage component is not limited to a picture, a video, an audio file, personal information, building plans, building information, inspection information, etc.

In some embodiments, the cap 120 is attached to the shell 110 via a screw mechanism. In some embodiments, the screw mechanism comprises a first screw component 180 disposed on the first end 111 of the shell 110 and a second screw component 280 disposed on the cap 120. In some embodiments, the first screw component 180 is a male screw component and the second screw component 280 is a female screw component. In some embodiments, the first screw component 180 is a female screw component and the second screw component 280 is a male screw component.

In some embodiments, the system further comprises a gasket 190 disposed between the first end 111 of the shell 110 and the cap 120. The gasket 190 is adapted to help provide a seal between the shell 110 and the cap 120. In some embodiments, an Allen socket 210 is disposed in the cap 120.

The disclosures of the following U.S. Patents are incorporated in their entirety by reference herein: U.S. Design Pat. No. D256,460; U.S. Design Pat. No. D322,862; U.S. Pat. No. 5,696,488; U.S. Pat. No. 5,729,921; U.S. Pat. No. 6,340,978; U.S. Pat. No. 6,414,663; U.S. Pat. No. 6,980,107; U.S. Pat. No. 7,089,495; U.S. Pat. No. 7,609,506.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A memory storage system 100 comprising:
   (a) a shell 110 having a first end 111, a second end 112, and an inner cavity 115;
   (b) a microprocessor 150 disposed in the inner, cavity 115 of the shell 110, the microprocessor 150 is operatively connected to a memory storage component 160 adapted to store information;
   (c) a connector socket 140 disposed in the first end of the shell 110 and operatively connected to the microprocessor 150, the connector socket 140 is adapted to operatively connect to a cable 142 of a computer system 105; and
   (d) a cap 120 removably attached to the shell 110 covering the connector socket 140, the cap 120 can move between at least an open position and a closed position respectively allowing and preventing access to the connector socket 140.

2. The system 100 of claim 1, wherein the shell 110 is generally bullet-shaped or cylindrical.

3. The system 100 of claim 1, wherein the shell 110 is constructed from a material comprising a non-corrosive metal.

4. The system 100 of claim 1, wherein the shell 110 is constructed from a material comprising stainless steel.

5. The system 100 of claim 1, wherein the inner cavity 115 of the shell 110 is filled with a material comprising nitrogen gas.

6. The system 100 of claim 1, wherein the shell 110 is adapted to be installed in a wall or a building, structure, or tombstone.

7. The system 100 of claim 1, wherein the memory storage component comprises flash memory, random access memory (RAM), read-only memory (ROM), static RAM, static ROM, electrically erasable programmable read-only memory (EEPROM), or a combination thereof.

8. The system 100 of claim 1, wherein the information stored on the memory storage component comprises a picture, a video, an audio file, personal information, building plans, building information, inspection information, or a combination thereof.

9. The system 100 of claim 1, wherein the cable 142 is a universal serial bus (USB) cable.

10. The system 100 of claim 1, wherein the computer system 105 is a laptop or a smart phone.

11. The system 100 of claim 1, wherein the cap 120 is attached to the shell 110 via a screw mechanism.

12. The system 100 of claim 11, wherein the screw mechanism comprises a first screw component 180 disposed on the first end 111 of the shell 110 and a second screw component 280 disposed on the cap 120.

13. The system 100 of claim 12, wherein the first screw component 180 is a male screw component and the second screw component 280 is a female screw component.

14. The system 100 of claim 12, wherein the first screw component 180 is a female screw component and the second screw component 280 is a male screw component.

15. The system 100 of claim 1 further comprising a gasket 190 disposed between the first end 111 of the shell 110 and the cap 120, the gasket 190 is adapted to help provide a seal between the shell 110 and the cap 120.

16. The system 100 of claim 1, wherein an Allen socket 210 is disposed in the cap 120.

* * * * *